US011519765B2

United States Patent
Yamashita et al.

(10) Patent No.: US 11,519,765 B2
(45) Date of Patent: Dec. 6, 2022

(54) CONTROL DEVICE, COMMUNICATION SYSTEM, AND CONTROL METHOD

(71) Applicant: FUJITSU LIMITED, Kawasaki (JP)

(72) Inventors: Koichiro Yamashita, Hachioji (JP); Takahisa Suzuki, Yokohama (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 16/684,763

(22) Filed: Nov. 15, 2019

(65) Prior Publication Data

US 2020/0080874 A1     Mar. 12, 2020

Related U.S. Application Data

(63) Continuation of application No. PCT/JP2017/018571, filed on May 17, 2017.

(51) Int. Cl.
*E01C 23/01*   (2006.01)
*E01D 22/00*   (2006.01)
(Continued)

(52) U.S. Cl.
CPC ............ *G01D 21/00* (2013.01); *E01C 23/01* (2013.01); *E01D 22/00* (2013.01); *G01D 3/08* (2013.01)

(58) Field of Classification Search
CPC .......... G01D 21/00; G01D 21/02; G01D 3/08; G01D 5/145; G01D 18/00; E01D 22/00;
(Continued)

(56) References Cited

U.S. PATENT DOCUMENTS

RE40,628 E  *  1/2009  Chen ................... H04N 5/3456
                                                              348/312
2006/0114793 A1*  6/2006  Tonami ................ G11B 7/0945
                                                              369/112.01
(Continued)

FOREIGN PATENT DOCUMENTS

JP        61-24791        2/1986
JP       2002-008178      1/2002
(Continued)

OTHER PUBLICATIONS

International Search Report (Form PCT/ISA/210, PCT/ISA/220, PCT/ISA/237) dated Aug. 15, 2017 for International Application No. PCT/JP2017/018571.

*Primary Examiner* — Jeffrey P Aiello
(74) *Attorney, Agent, or Firm* — Fujitsu Patent Center

(57) ABSTRACT

When the measurement values measured by a first sensor among a plurality of sensors installed in a dispersed manner at a specific location, in first cycles are determined to be abnormal values, a control device activates the first sensor in second cycles that are shorter than the first cycles. Moreover, when the abnormal values are included in the trend of temporal variation, the control device activates a plurality of second sensors, which is installed around the first sensor, in the second cycles. Moreover, when the measurement values measured by the first sensor and the plurality of second sensors in the second cycles are included in the trend of surface-direction distribution, the control device outputs the measurement values measured by the first sensor and the plurality of second sensors.

8 Claims, 14 Drawing Sheets

(51) Int. Cl.
*G01D 3/08* (2006.01)
*G01D 21/00* (2006.01)

(58) Field of Classification Search
CPC ....... E01C 23/01; G01L 5/0085; G01R 33/07; G05B 23/02; G05B 23/024
USPC .......... 73/301; 324/307.2; 702/41, 104, 141, 702/150–151, 185; 714/819
See application file for complete search history.

(56) References Cited

U.S. PATENT DOCUMENTS

| | | | |
|---|---|---|---|
| 2007/0027609 A1* | 2/2007 | Watanabe | F02D 11/107 701/114 |
| 2009/0021244 A1* | 1/2009 | May | G01L 3/103 324/207.2 |
| 2017/0185856 A1* | 6/2017 | Park | G06K 9/00892 |
| 2017/0212498 A1* | 7/2017 | Laxhuber | A61B 17/00 |

FOREIGN PATENT DOCUMENTS

| | | | |
|---|---|---|---|
| JP | 2002008178 A | * | 1/2002 |
| JP | 2012-112862 | | 6/2012 |
| JP | 2016-218961 | | 12/2016 |
| JP | 2016218961 A | * | 12/2016 |

* cited by examiner

| SENSOR ID | RANGE | | | |
|---|---|---|---|---|
| | r=1 | r=2 | ... | r=R |
| S001 | S001, S010, S011, S012 | S001, S010, S011, S012, S013... | ... | S001, S010, ...S01n |
| S002 | S002, S020, S021, S022 | S002, S020, S021, S022, S023... | ... | S002, S020, ...S02n |
| S003 | S003, S030, S031, S032 | S003, S030, S031, S032, S033... | ... | S003, S030, ...S03n |
| ⋮ | ⋮ | ⋮ | ⋱ | ⋮ |

220

CONTROL DEVICE, COMMUNICATION SYSTEM, AND CONTROL METHOD

CROSS-REFERENCE TO RELATED APPLICATION

This application is a continuation application of International Application PCT/JP2017/018571, filed on May 17, 2017, and designating the U.S., the entire contents of which are incorporated herein by reference.

FIELD

The present invention relates to a control device, a communication system, and a control method.

BACKGROUND

As far as monitoring of infrastructure such as bridges, roads, and building structures is concerned, daily monitoring by visual inspection is carried out. As a result of performing daily monitoring, it becomes possible to perform asset management in which mainly qualitative observation is carried out regarding the changes occurring with respect to the normal situation. Thus, asset management is not about detecting abnormality, but to detect the signs of abnormality and accordingly take measures in an early stage. In recent years, a sensor network is being studied in which, using information obtained from a plurality of sensors installed at various locations, abnormality detection is carried out at the installation locations of the sensors. Moreover, conventionally, a technology is known in which, when abnormal measurement data is detected from a measurement device, if the abnormal value is detected only once, then the abnormal measurement data is destroyed on account of being determined as a measurement mistake or noise. Conventional technique is described in Japanese Laid-open Patent Publication No. S61-24791.

Meanwhile, the observation of the changes occurring with respect to the normal situation is largely dependent on the level of skill of the person doing visual inspection; and, although there are determinate numerical criteria regarding inspection details, it is a difficult task to thoroughly observe all aspects in the target objects spanning over a wide range. Moreover, regarding the task of screening in which, from among the target objects spanning over a wide range, the target objects that have not yet developed abnormality but that may develop abnormality in future are sampled and are observed as much as possible; it is difficult to achieve computerization of the task of screening. Particularly, an expert person is skilled in differentiating the type of noise or in differentiating whether or not a slight change hidden due to noise is a sign of possible abnormality in future. However, the differentiation performed by such an expert person is difficult to computerize.

SUMMARY

According to an aspect of an embodiment, a control device includes a first determining unit, a first activation instructing unit, a first identifying unit, a second determining unit, a second activation instructing unit, a second identifying unit, a third determining unit, and an output unit. The first determining unit determines whether or not measurement value measured by a first sensor among a plurality of sensors installed in a dispersed manner at specific location, in a first cycle, is an abnormal value. The first activation instructing unit activates the first sensor in a second cycle which is shorter than the first cycle when the measurement value is determined to be an abnormal value. The first identifying unit identifies trend of temporal variation in measurement values measured by the first sensor in the first cycle and the second cycle. The second determining unit determines whether or not the abnormal value is included in the trend of temporal variation. The second activation instructing unit activates a plurality of second sensors which is installed around the first sensor, in the second cycle, when the abnormal value is included in the trend of temporal variation. The second identifying unit identifies trend of surface-direction distribution of measurement values measured by the first sensor and the plurality of second sensors in the second cycle. The third determining unit determines whether or not measurement values measured by the first sensor and the plurality of second sensors in the second cycle are included in the trend of the surface-direction distribution. The output unit outputs measurement values measured by each of the first sensor and the plurality of second sensors, when measurement values measured by the first sensor and the plurality of second sensors in the second cycle are included in the trend of the surface-direction distribution.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An exemplary embodiment of a control device, a control system, and a control method disclosed in the application concerned is described below in detail with reference to the accompanying drawings. However, the technology disclosed herein is not limited by the embodiment described below.

Embodiment

[Communication System 10]

Figure 1:
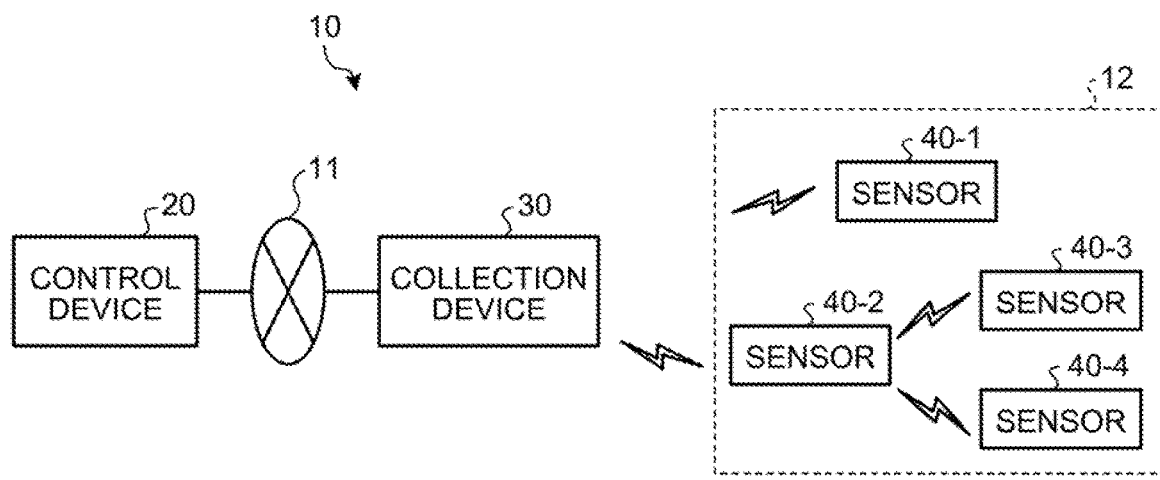
FIG. 1 is a diagram illustrating an example of a communication system.

FIG. 1 is a diagram illustrating an example of a communication system 10. The communication system 10 includes a control device 20, a collection device 30, and a plurality of sensors 40-1 to 40-4. The control device 20 and the collection device 30 are connected to a network 11 such as the Internet. In the following explanation, in the case of collectively referring to the sensors 40-1 to 40-4 without distinguishing therebetween, they are referred to as sensors 40. In the communication system 10 illustrated in FIG. 1, four sensors 40 are installed. However, the communication system 10 can alternatively have five more or sensors 40 installed therein. Moreover, in the communication system 10 illustrated in FIG. 1, a single collection device 30 is installed. However, the communication system 10 can alternatively have two or more collection devices 30 installed therein.

The sensors 40 are installed in a dispersed manner within a predetermined area 12, and perform wireless communication with the collection device 30 based on a wireless communication method such as Bluetooth (registered trademark). The area 12 in which the sensors 40 are installed represents the target area for monitoring, such as an area of a slope of a mountain or an area of a surface of a building structure such as a bridge or a road. For example, each sensor 40 measures various types of physical quantities such as vibrations, amount of rainfall, acceleration, or temperature at the installation location thereof.

When an activation instruction is received from the collection device 30, each sensor 40 measures a physical quantity at the installation location thereof and wirelessly sends the measured value to the collection device 30. Meanwhile, if any sensor 40 finds it difficult to perform direct wireless communication with the collection device 30, it performs communication with the collection device 30 via the other sensors 40.

The collection device 30 performs wireless communication with each sensor 40 based on a wireless communication method such as Bluetooth. The collection device 30 receives the measurement value sent from each sensor 40; and sends the measurement values and sensor IDs, which enable identification of the respective sensors 40, to the control device 20 via the network 11. Moreover, when an activation instruction including a sensor ID is received from the control device 20 via the network 11, the collection device 30 sends the activation instruction to the sensor 40 having the specified sensor ID.

The control device 20 controls the activation cycles of each sensor 40 via the network 11 and the collection device 30. More particularly, the control device 20 issues an activation instruction for activation in first cycles to some of the sensors 40 installed within the area 12, and activates the concerned sensors 40 in the first cycles. Then, based on the measurement values measured by the sensors 40 activated in the first cycles, the control device 20 determines whether or not any abnormal values are present among the measurement values.

If the measurement values of any sensor 40 are abnormal values, then the control device activates that sensor 40 in second cycles that are shorter than the first cycles, and thus collects the measurement values of the sensor 40, from which the abnormal values are obtained, in shorter cycles. Then, based on the measurement values collected in shorter cycles, the control device 20 determines whether or not the measured abnormal values represent noise. If it is determined that the measured abnormal values do not represent noise, then the control device 20 further activates, in the second cycles, a plurality of other sensors 40 installed around the sensor 40 that measured the abnormal values.

Then, based on the measurement values measured by the sensors 40 activated in the second cycles, the control device 20 identifies trend of the distribution of the measurement values in the surface direction of the area in which the concerned sensors 40 are installed. Subsequently, if the measurement values measured by the sensors 40 are included in the identified trend of the surface-direction distribution, then the control device 20 sends the measurement values, which are obtained from the concerned sensors 40, via the network 11 to a monitoring device that monitors the area 12 within which the sensors 40 are installed.

Meanwhile, a natural phenomenon or an abnormality in a building structure makes progress with continuity in the surface direction within an area of certain range. Hence, if the abnormal values measured by the sensor 40 at a particular site represents the abnormal values attributed to some natural phenomenon or deterioration in a building structure, then the measurement values that are obtained within the area of a predetermined range including the site of the sensor 40 which measured the abnormality values exhibit a distribution having continuity in the surface area. In that regard, in the present embodiment, when abnormal values not representing noise are obtained, the control device 20 further activates a plurality of other sensors 40 installed within a predetermined range including the sensor 40 that measured the abnormal values. Then, based on the measurement values measured by those sensors 40, the control device 20 identifies the trend of the distribution of the measurement values in the surface direction. Subsequently, if the measurement values measured from the sensors 40 are included in the identified trend of the surface-direction distribution, then the control device 20 sends the measurement values measured by the sensors 40 to the monitoring device. As a result, the control device 20 can hold back from sending, to the monitoring device, the measurement values not indicating any signs of some natural, phenomenon or some abnormality of a building structure; and can reliably send, to the monitoring device, the measurement values indicating signs of some natural phenomenon or some abnormality of a building structure. As a result, while managing the management targets, the communication system 10 can hold down on unnecessary field investigation.

[Sensor 40]

Figure 2:
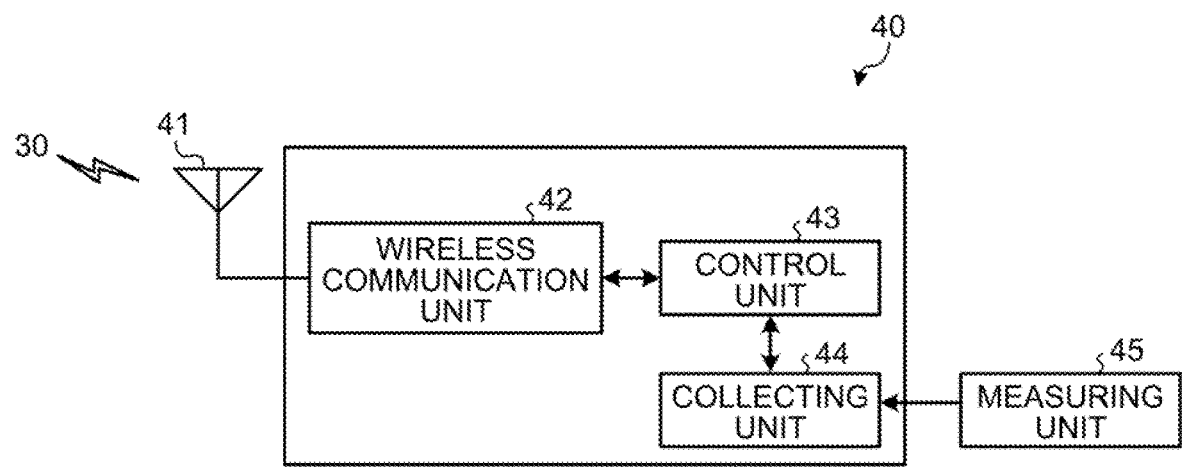
FIG. 2 is a block diagram illustrating an example of a sensor.

FIG. 2 is a diagram illustrating an example of the sensor 40. The sensor 40 includes an antenna 41, a wireless communication unit 42, a control unit 43, a collecting unit 44, and a measuring unit 45. The wireless communication unit 42 performs wireless communication with the collection device 30 and with the other sensors 40 via the antenna 41.

The control unit 43 gets activated upon receiving an activation instruction from the collection device 30 via the wireless communication unit 42, and instructs the collecting unit 44 to collect the measurement values. Subsequently, when the measurement values are output by the collecting unit 44, the control unit 43 sends the measurement values, which are output by the collecting unit 44, to the collection device 30 via the wireless communication unit 42. Meanwhile, when the sensor 40 is not in the activated state, the control unit 43 controls the blocks of the sensor 40, excluding the wireless communication unit 42, in a low power consumption state.

When an instruction for collection of the measurement values is issued by the control unit 43, the collecting unit 44 controls the measuring unit 45 and collects the measurement values therefrom. Then, the collecting unit 44 outputs the collected measurement values to the control unit 43. The measuring unit 45 measures the measurement values under the control of the collecting unit 44, and outputs the measurement values to the collecting unit 44. For example, the measuring unit 45 measures the vibrations, the amount of rain, the acceleration, or the temperature at the installation location of the corresponding sensor 40.

[Collection Device 30]

Figure 3:
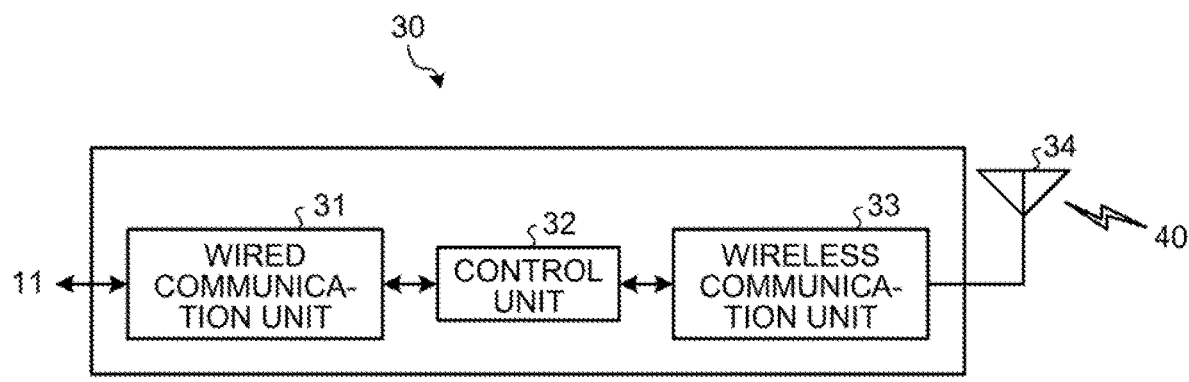
FIG. 3 is a block diagram illustrating an example of a collection device.

FIG. 3 is a diagram illustrating an example of the collection device 30. The collection device 30 includes a wired communication unit 31, a control unit 32, a wireless communication unit 33, and an antenna 34. The wired communication unit 31 performs wired communication with the control device 20 via the network 11. The wireless communication unit 33 performs wireless communication with the sensor 40 via the antenna 34.

When an activation instruction including a sensor ID is received from the control device 20 via the wired communication unit 31; the control unit 32 sends, via the wireless communication unit 33, an activation instruction to the sensor 40 having the specified sensor ID. Moreover, when the measurement values from any sensor 40 are received via the wireless communication unit 33; the control unit 32 sends the measurement values along with the sensor ID of the sensor 40, which sent the measurement values, to the control device 20 via the wired communication unit 31.

[Control Device 20]

Figure 4:
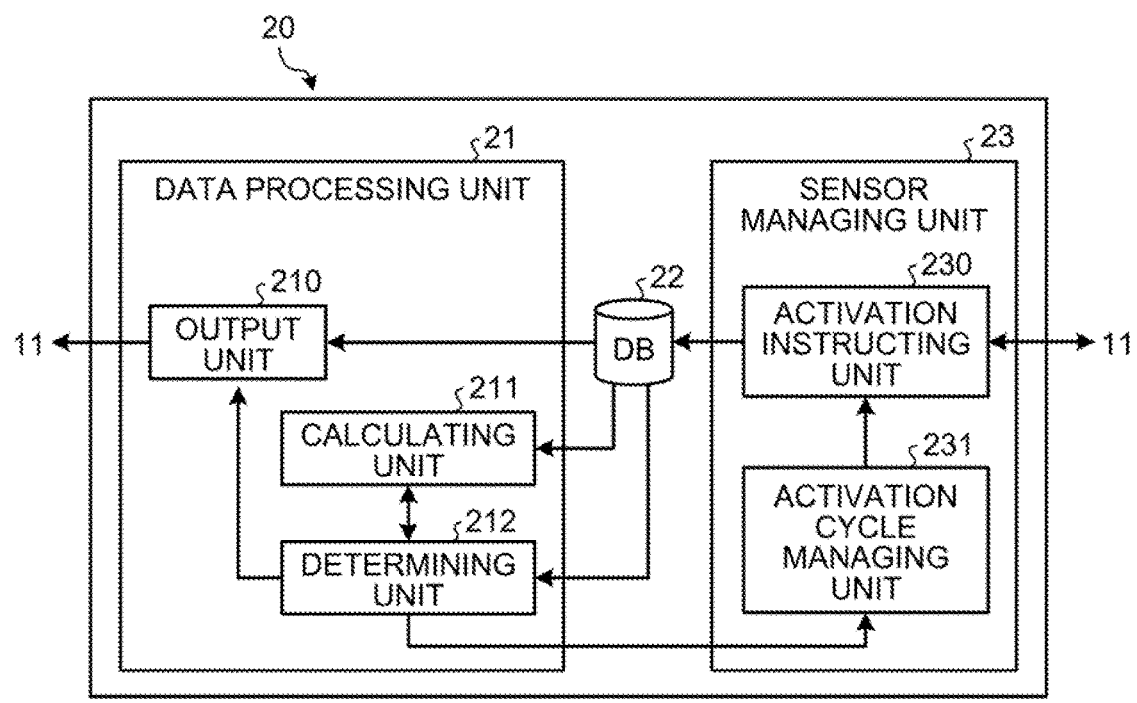
FIG. 4 is a block diagram illustrating an example of a control device.
Figures 5, 6:
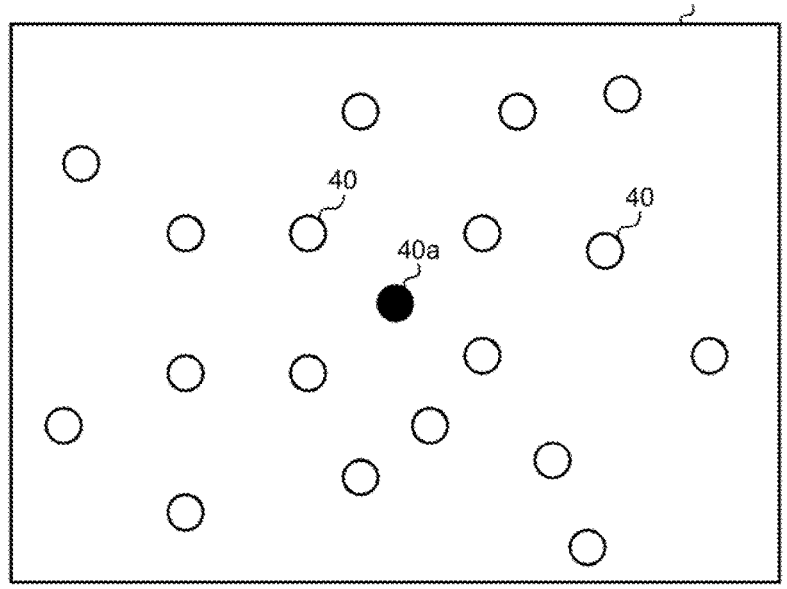
FIG. 5 is a diagram illustrating an example of a range table.
FIG. 6 is a diagram illustrating an example of a sensor that is activated in the normal situation.

FIG. 4 is a diagram illustrating an example of the control device 20. The control device 20 includes a data processing unit 21, a Data Base (DB) 22, and a sensor managing unit 23. In the DB 22, in a corresponding manner to each sensor ID, the measurement value measured by the sensor 40 having the concerned sensor ID is stored along with the timing of measurement of the measurement value. Moreover, for example, a range table 220 as illustrated in FIG. 5 is stored in the DB 22. FIG. 5 is a diagram illustrating an example of the range table 220. In the range table 220, in a corresponding manner to each sensor ID, the sensor 40 having that sensor ID is stored along with the sensor IDs of the other sensors 40 installed around the concerned sensor 40.

In the range table 220 illustrated in FIG. 5, in a range "r=1" corresponding to a sensor ID "S001", sensor IDs "S001", "S010", "S011", and "S012" are included. Moreover, in the range table 220 illustrated in FIG. 5, in a range "r=2" corresponding to the sensor ID "S001", sensor IDs "S001", "S010", "S011", "S012", "S013", and so on are included. In this way, in the range table 220, in a range "r=n" corresponding to each sensor ID, greater the value of "n", the greater is the number of sensor IDs included in the range "r=n". In the range table 220 illustrated in FIG. 5, information up to a range "r=R" is stored. Meanwhile, in the range "r=1", at least four sensor IDs are included.

Returning to the explanation with reference to FIG. 4, the sensor managing unit 23 includes an activation instructing unit 230 and an activation cycle managing unit 231. The activation cycle managing unit 231 manages the activation cycles of each sensor 40 based on an instruction received from the data processing unit 21, and outputs to the activation instructing unit 230 the sensor IDs of the sensors 40 for which the activation timing has arrived.

When a sensor ID is output from the activation cycle managing unit 231, the activation instructing unit 230 sends an activation instruction including that sensor ID to the collection device 30 via the network 11. Moreover, when a sensor ID and a measurement value is received from the collection device 30 via the network 11, the activation instructing unit 230 stores the received measurement value in a corresponding manner to the measurement timing and the sensor ID in the DB 22. Herein, the activation instructing unit 230 represents an example of a first activation instructing unit and a second activation instructing unit.

The data processing unit 21 includes an output unit 210, a calculating unit 211, and a determining unit 212. The calculating unit 211 represents an example of a first identifying unit and a second identifying unit. The determining unit 212 represents an example of a first determining unit, a second determining unit, and a third determining unit. The determining unit 212 obtains, from the DB 22, the measurement values measured in the first cycles of some of a plurality of sensors 40 installed in a dispersed manner within the area 12. The first cycles are, for example, cycles spanning over a few hours to a few days. Then, the determining unit 212 determines whether or not the obtained measurement values are abnormal values.

For example, as illustrated in FIG. 6, a sensor 40a, which is one of a plurality of sensors 40 installed within the area 12, is activated in the first cycles in the normal situation; and the measurement values measured by the sensor 40a are sent to the control device 20 via the collection device 30. FIG. 6 is a diagram illustrating an example of the sensor 40a that is activated in the normal situation. From among the sensors 40 illustrated in FIG. 6, a filled circle represents the sensor 40a that is activated in the first cycles, and open circles represent the sensors 40 maintained in the low power consumption state. Meanwhile, in the example illustrated in FIG. 6, although a single sensor 40a is activated within the area 12 in the first cycles, there can be a plurality of sensors 40a installed within the area 12. Herein, the sensor 40a is an example of a first sensor.

The determining unit 212 compares the measurement values measured by the sensor 40a in the first cycle with a reference value calculated by performing statistical processing of the measurement values measured in the past. The reference value is an example of a statistical value. If a measurement value, which is obtained by the sensor 40a in the first cycles, and the reference value have a difference D equal to or greater than a threshold value, then the determining unit 212 determines that the measurement value is an abnormal value. In the present embodiment, the reference value is, for example, the average value of the measurement values measured by the sensor 40a till a predetermined point of time in the past. Alternatively, the reference value can be a value calculated based on the measurement values measured by such sensors 40 which are configured to measure the measurement values of other types. For example, if the sensor 40a is configured to measure the temperature, then the reference value can be a value calculated based on the amount of sunlight measured by other sensors 40.

Figure 7:
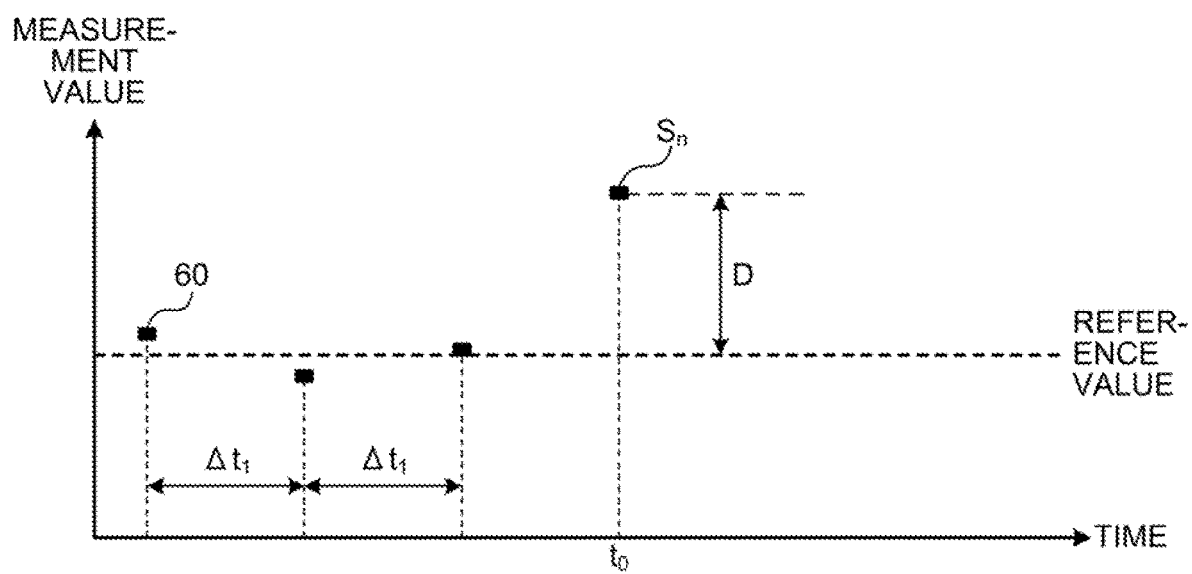
FIG. 7 is a diagram illustrating an exemplary measurement value determined to be an abnormal value.

FIG. 7 is a diagram illustrating an exemplary measurement value determined to be an abnormal value. For example, as illustrated in FIG. 7, the sensor 40a is activated in each first cycle $\Delta t_1$ and measures a measurement value 60. Then, if the difference D between a measurement value $S_n$, which is obtained at a timing $t_0$, and the reference value is equal to or greater than a threshold value, the determining unit 212 determines that the measurement value $S_n$ is an abnormal value.

When the measurement value $S_n$ is determined to be an abnormal value, the determining unit 212 instructs the activation cycle managing unit 231 to change the activation cycles from the first cycles $\Delta t_1$ to second cycles $\Delta t_2$ that are shorter than the first cycles $\Delta t_1$. The second cycles $\Delta t_2$ are, for example, cycles spanning over a few minutes to a few tens of minutes. In response to the instruction received from the determining unit 212, the activation cycle managing unit 231 changes the activation cycles of the sensor 40a from the first cycles $\Delta t_1$ to the second cycles $\Delta t_2$. As a result, an activation result is sent to the sensor 40a after each second cycle $\Delta t_2$, and the measurement value is collected from the sensor 40a after each second cycle $\Delta t_2$.

Subsequently, the determining unit 212 instructs the calculating unit 211 to identify the trend of temporal variation in the measurement values measured by the sensor 40a in the first cycles $\Delta t_1$ and in the second cycles $\Delta t_2$. In response to the instruction received from the determining unit 212, the calculating unit 211 identifies the trend of temporal variation in the measurement values measured by the sensor 40a in the first cycles $\Delta t_1$ and in the second cycles $\Delta t_2$.

More particularly, from the DB 22, the calculating unit 211 obtains the measurement values measured in the first cycles $\Delta t_1$, and obtains the measurement values that are measured in the second cycles $\Delta t_2$ between the period of time from the timing $t_0$ to a timing $t_1$ at which the period of time corresponding to the first cycle $\Delta t_1$ elapses. Then, based on the obtained measurement values, the calculating unit 211 identifies, as the trend of temporal variation in the measurement values, an approximation curve that approximates the temporal variation in the measurement values. For example, the calculating unit 211 identifies the approximation curve by fitting a predetermined function, which is represented by the order corresponding to the number of measurement values, in the chronological measurement values using the method of least square. Then, the calculating unit 211 outputs, to the determining unit 212, the identified approximation curve as the trend of temporal variation in the measurement values.

Subsequently, the determining unit 212 determines whether or not the measurement value $S_n$, which is determined to be an abnormal value, is included in the trend of temporal variation in the measurement values as identified by the calculating unit 211. If the measurement value $S_n$, which is determined to be an abnormal value, is not included in the trend of temporal variation in the measurement values as identified by the calculating unit 211, then the determining unit 212 determines that the measurement value $S_n$ represents noise. Then, the determining unit 212 instructs the activation cycle managing unit 231 to reset the activation cycles of the sensor 40a from the second cycles $\Delta t_2$ to the first cycles $\Delta t_1$. In response to the instruction received from the determining unit 212, the activation cycle managing unit 231 resets the activation cycles of the sensor 40a from the second cycles $\Delta t_2$ to the first cycles $\Delta t_1$.

More particularly, based on the approximation curve identified by the calculating unit 211, the determining unit 212 identifies a measurement value $S_n$' that is present on the approximation curve at the same timing as the timing of the measurement value $S_n$ determined to be an abnormal value. If a difference $\Delta S$ between the measurement value $S_n$ and the measurement value $S_n$' is equal to or greater than a threshold value, then the determining unit 212 determines that the measurement value $S_n$, which is determined to be an abnormal value, is not included in the temporal variation in the measurement values as identified by the calculating unit 211.

Figure 8:
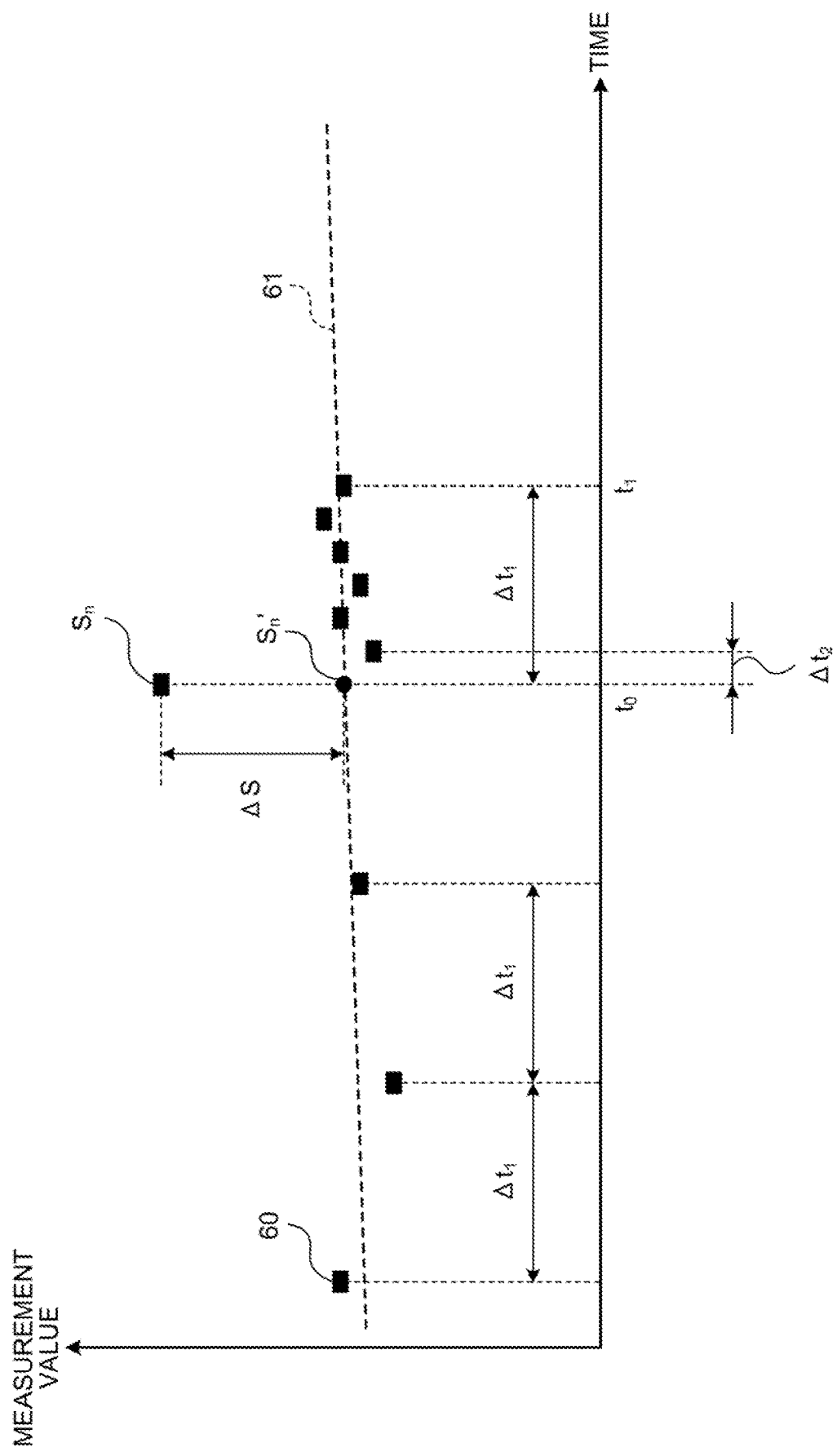
FIG. 8 is a diagram illustrating an example of the measurement value that is determined to represent noise.

FIG. 8 is a diagram illustrating an example of the measurement value $S_n$ that is determined to represent noise. For example, as illustrated in FIG. 8, based on the measurement values measured by the sensor 40a in the first cycles $\Delta t_1$ and in the second cycles $\Delta t_2$ up to the timing t1, an approximation curve 61 gets identified. In the example illustrated in FIG. 8, the measurement value $S_n$, which is determined to be an abnormal value, and the measurement value $S_n$', which is present at the same timing to on the approximation curve 61 as the timing of the measurement value $S_n$, have the difference $\Delta S$ equal to or greater than a threshold value. Hence, the determining unit 212 determines that the measurement value $S_n$, which is determined to be an abnormal value, is not included in the trend of temporal variation in the measurement values as identified by the calculating unit 211; and determines that the measurement value $S_n$ represents noise.

Figure 9:
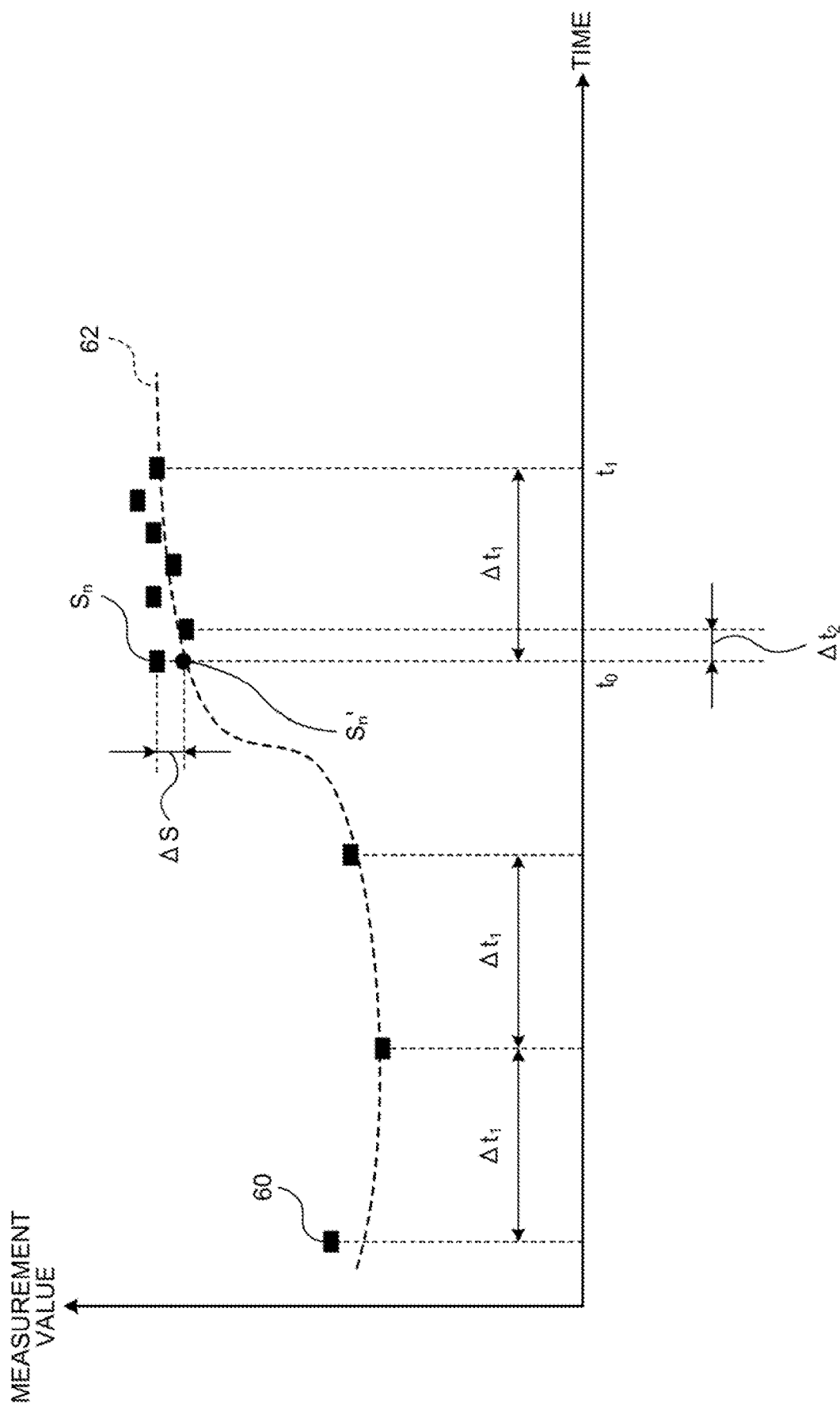
FIG. 9 is a diagram illustrating an example of the measurement value that is determined not to represent noise.

FIG. 9 is a diagram illustrating an example of the measurement value $S_n$ that is determined not to represent noise. For example, as illustrated in FIG. 9, based on the measurement values measured by the sensor 40a in the first cycles $\Delta t_1$ and in the second cycles $\Delta t_2$ up to the timing t1, an approximation curve 62 gets identified. In the example illustrated in FIG. 9, the measurement value $S_n$, which is determined to be an abnormal value, and the measurement value $S_n$', which is present at the same timing to on the approximation curve 62 as the timing of the measurement value $S_n$', have the difference $\Delta S$ smaller than the threshold value. Hence, the determining unit 212 determines that the measurement value $S_n$, which is determined to be an abnormal value, is included in the trend of temporal variation in the measurement values as identified by the calculating unit 211; and determines that the measurement value $S_n$ does not represent noise.

When the measurement value $S_n$, which is determined to be an abnormal value, is determined not to represent noise; the determining unit 212 extracts, from the range table 220 in the DB 22, the sensor IDs included in the range "r=1" that corresponds to the sensor ID of the sensor 40a. Then, the determining unit 212 instructs the activation cycle managing unit 231 to activate the sensors 40 having the extracted sensor IDs in the second cycles $\Delta t_2$. In response to the instruction received from the determining unit 212, the activation cycle managing unit 231 sets the activation cycles of the sensors 40 having the sensor IDs specified by the determining unit 212 to the second cycles $\Delta t_2$. As a result, in each second cycle $\Delta t_2$, an activation instruction is sent to the sensor 40a and to a plurality of sensors 40 installed around the sensor 40a, and the measurement values from those sensors 40 are collected in each second cycle $\Delta t_2$.

Figure 10:
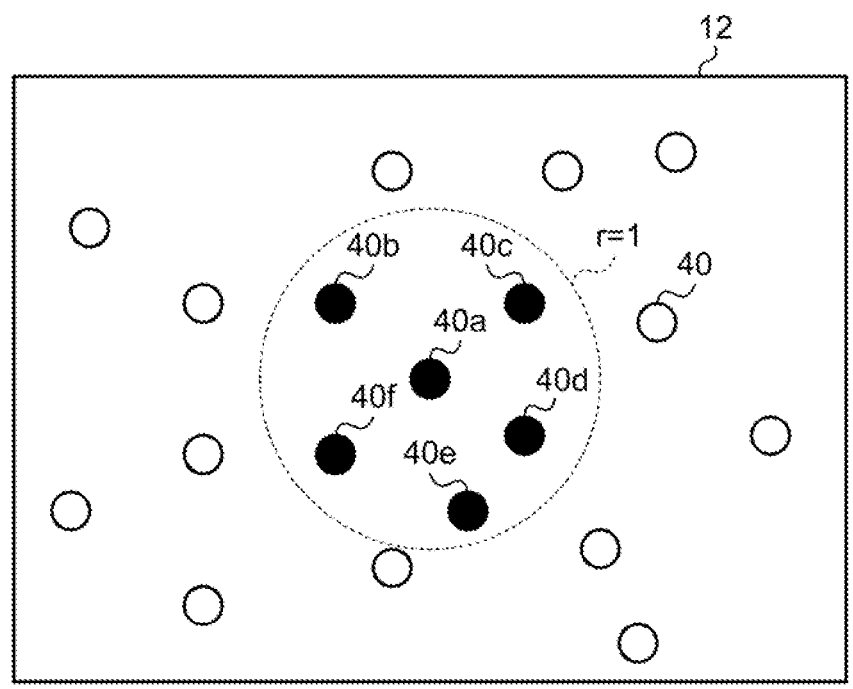
FIG. 10 is a diagram illustrating an example of sensors that are activated when an abnormal value not representing noise is detected.
Figure 11:
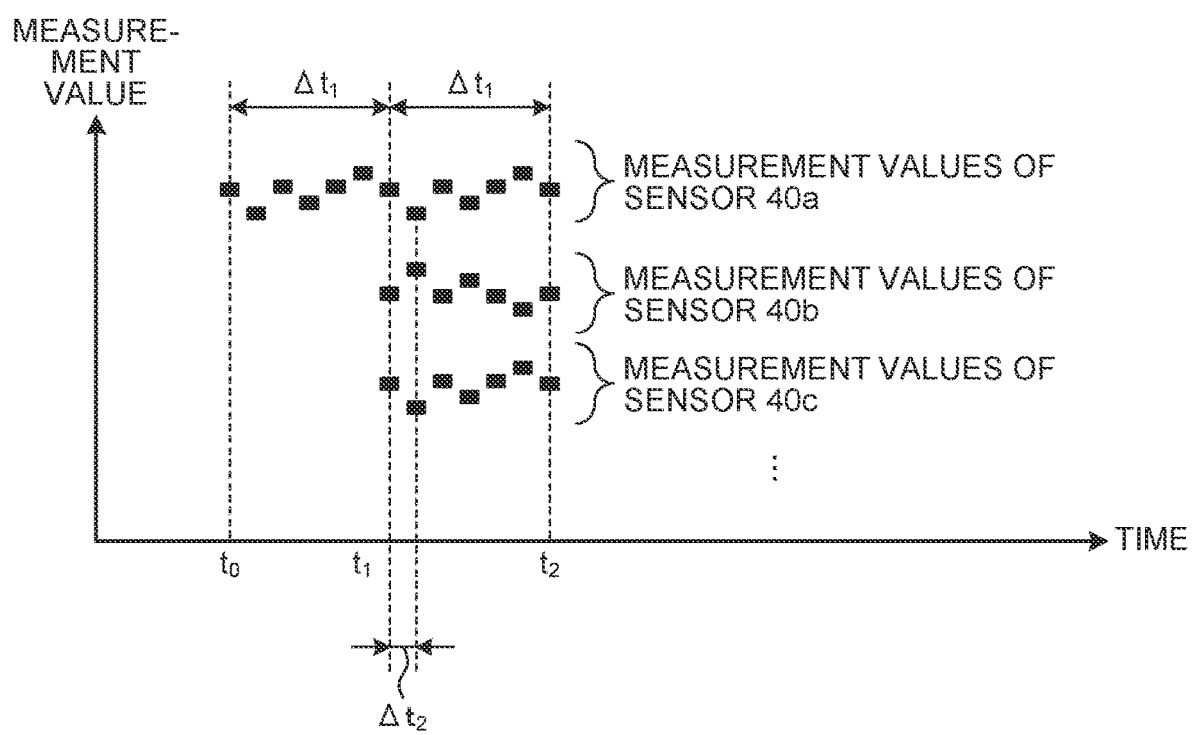
FIG. 11 is a diagram illustrating an example of the measurement values of each sensor.

FIG. 10 is a diagram illustrating an example of the sensors 40 that are activated when an abnormal value not representing noise is detected. When it is determined that the measurement value $S_n$, which is determined to be an abnormal value, is determined not to represent noise; for example, as illustrated in FIG. 10, other sensors 40b to 40f that are installed around the sensor 40a are further activated in the second cycles $\Delta t_2$. Herein, the sensors 40b to 40f are examples of second sensors. From among the sensors 40 illustrated in FIG. 10, filled circles represent the sensors 40a to 40f that are activated in the second cycles $\Delta t_2$, and open circles represent the sensors 40 maintained in the low power consumption state. As a result, for example, as illustrated in FIG. 11, in each second cycle $\Delta t_2$, the measurement value is collected from the concerned sensors 40. FIG. 11 is a diagram illustrating an example of the measurement values of each concerned sensor.

Subsequently, the determining unit 212 instructs the calculating unit 211 to identify the trend of the surface-direction distribution of the measurement values that are measured by the sensors 40a to 40f in the second cycles $\Delta t_2$. In response to the instruction received from the determining unit 212, the calculating unit 211 identifies the trend of the surface-direction distribution of the measurement values at each timing as measured by the sensors 40a to 40f in the second cycles $\Delta t_2$.

Figure 12:
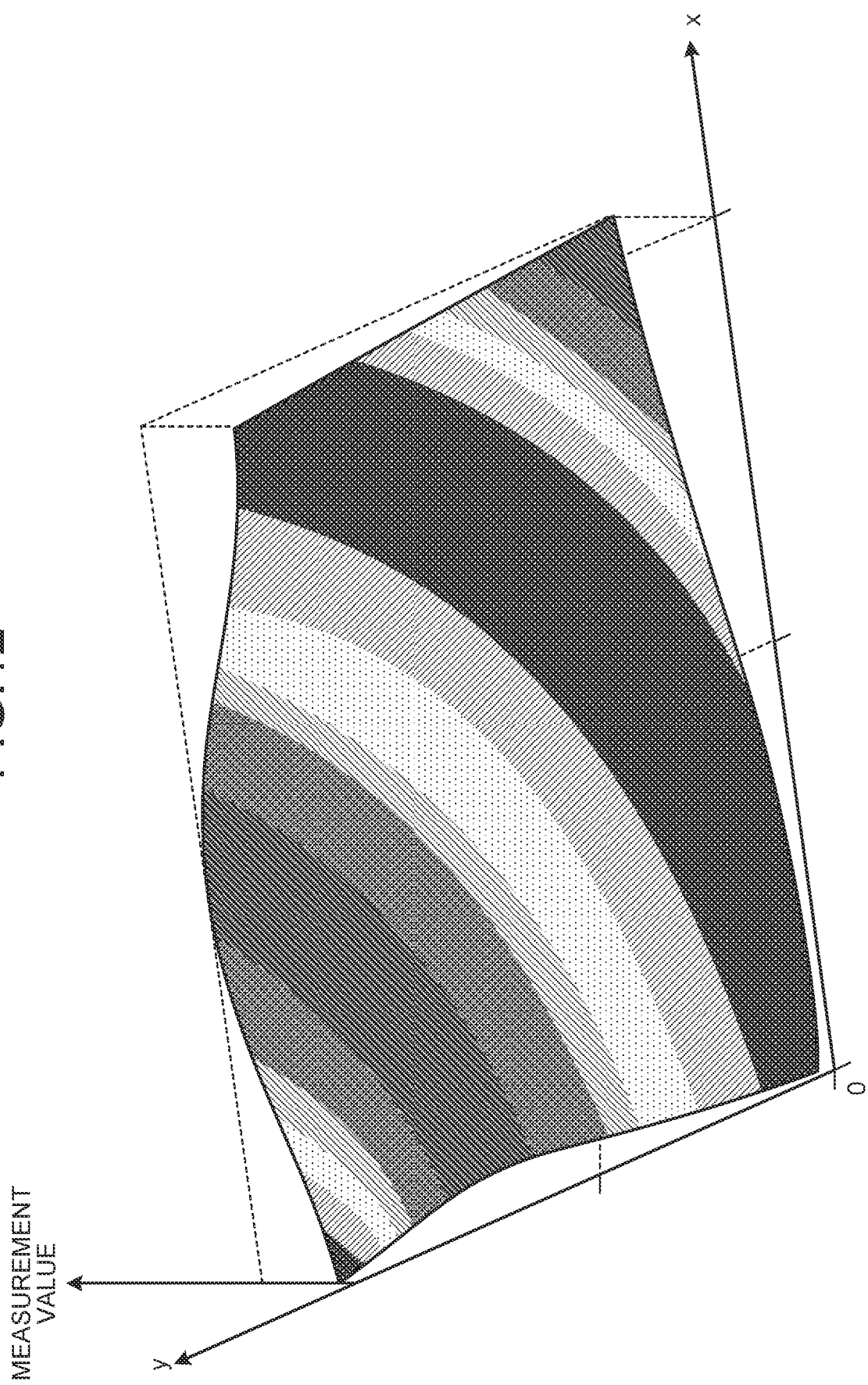
FIG. 12 is a diagram illustrating an example of an approximation curved surface.

More particularly, the calculating unit 211 obtains, from the DB 22, the measurement values measured by each sensor 40 in the second cycles $\Delta t_2$ between the period of time from the timing $t_1$ to a timing $t_2$ at which the period of time corresponding to the first cycle $\Delta t_1$ elapses. Then, based on the measurement values measured by the sensors 40a to 40f, at each timing of measurement of the measurement values; the calculating unit 211 identifies, as the trend of the surface-direction distribution of the measurement values, an approximation curved surface that approximates the surface-direction distribution of the measurement values. FIG. 12 is a diagram illustrating an example of the approximation curved surface. For example, the calculating unit 211 identifies the approximation curved surface by fitting a predetermined function, which is represented by the order corresponding to the number of measurement values measured by the sensors 40a to 40f, at each measurement timing using the method of least square. Then, the calculating unit 211, outputs, to the determining unit 212, the identified approximation curved surface as the trend of the surface-direction distribution of the measurement values.

Subsequently, the determining unit 212 determines, at each timing of measurement of the measurement values, whether or not the measurement values measured by the sensors 40 are included in the trend of the surface-direction distribution of the measurement values as identified by the calculating unit 211. For example, if the measurement values measured by the sensors 40 at all measurement timings are included in the distribution identified by the calculating unit 211, then the determining unit 212 determines that the measurement values measured by the sensors 40 are included in the distribution identified by the calculating unit 211. Alternatively, if the measurement values measured by the sensors 40 at such a number of measurement timings which is equal to or greater than a predetermined ratio of all measurement timings are included in the distribution identified by the calculating unit 211, then the determining unit 212 can determine that the measurement values measured by the sensors 40 are included in the distribution identified by the calculating unit 211.

If the measurement values measured by the sensors 40 are included in the trend of the surface-direction distribution, then the determining unit 212 outputs the sensor IDs of those sensors 40 to the output unit 210. Then, the output unit 210 obtains, from the DB 22, the measurement values corresponding to the sensor IDs output from the determining unit 212; and outputs, to the monitoring device via the network 11, an alert including the obtained measurement values and the sensor IDs. Thereafter, as needed, the output unit 210 obtains, from the DB 22, the measurement values corresponding to the sensor IDs output by the determining unit 212; and sends the measurement values to the monitoring device.

Figure 13:
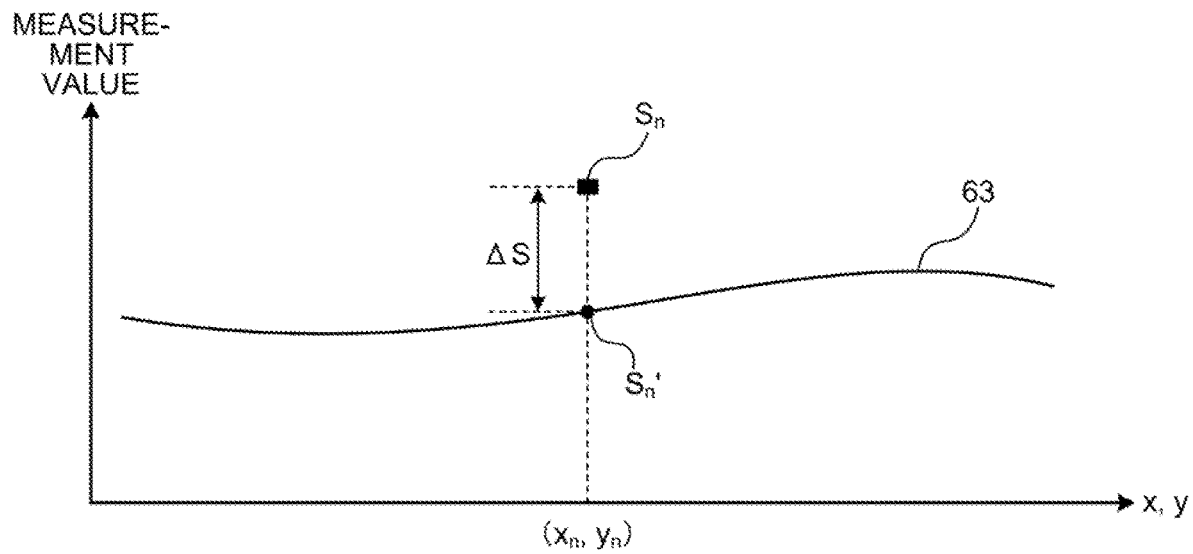
FIG. 13 is a diagram for explaining an example of the difference between the approximation curved surface and the measurement value of each sensor.

More particularly, for example, as illustrated in FIG. 13, at each timing of measurement of the measurement value $S_n$, the determining unit 212 identifies the measurement value $S_n'$ that is present on an approximation curved surface 63 identified by the calculating unit 211 and that corresponds to a position ($x_n$, $y_n$) of each of the sensors 40a to 40f. FIG. 13 is a diagram for explaining an example of the difference between the approximation curved surface and the measurement value of each sensor. Then, at each timing of measurement of the measurement value $S_n$, the determining unit 212 calculates the difference $\Delta S$ between the measurement value $S_n$ measured by each of the sensors 40a to 40f and the identified measurement value $S_n'$. Subsequently, the determining unit 212 adds the difference $\Delta S$ calculated for the measurement value $S_n$ measured by each of the sensors 40a to 40f, and calculates a cumulative difference $\Delta S'$. If the cumulative difference $\Delta S'$ is smaller than a threshold value, then the determining unit 212 determines that the measurement values measured by the sensors 40a to 40f are included in the trend of the surface-direction distribution of the measurement values as identified by the calculating unit 211.

On the other hand, if the measurement values measured by the sensors 40a to 40f are not included in the trend of the surface-direction distribution, then the determining unit 212 extracts, from the range table 220 in the DB 22, the sensor IDs included in the range "r=2" that is associated to the sensor ID of the sensor 40a. Then, the determining unit 212 instructs the activation cycle managing unit 231 to further activate the sensors 40 having the extracted sensor IDs in the second cycle $\Delta t_2$. In response to the instruction received from the determining unit 212, the activation cycle managing unit 231 sets the activation cycles of the sensors 40 having the sensor IDs specified by the determining unit 212 to the second cycles $\Delta t_2$.

Figure 14:
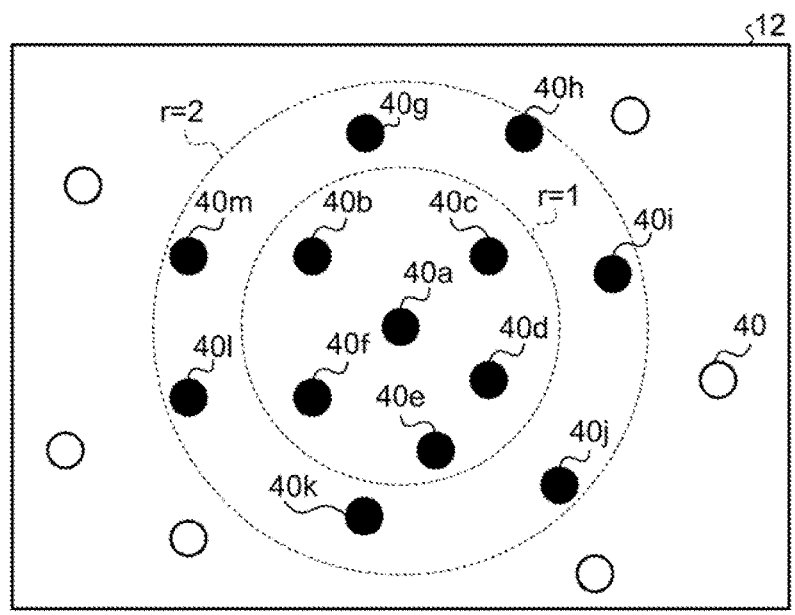
FIG. 14 is a diagram illustrating an example of the sensors that are activated when there is a large cumulative difference between the approximation curved surface and the measurement values of the sensors.

As a result, for example, as illustrated in FIG. 14, in each second cycle $\Delta t_2$, an activation signal is sent to the sensor 40a and a plurality of sensors 40b to 40m installed around the sensor 40a, and the measurement values in each second cycle $\Delta t_2$ are collected from the sensors 40b to 40m. FIG. 14 is a diagram illustrating an example of the sensors that are activated when there is a large cumulative difference between the approximation curved surface and the measurement values of the sensors. For example, as illustrated in FIG. 14, the sensor IDs of the sensors 40a to 40m, which are installed in a wider area than the area in which the sensors 40a to 40f having the sensor IDs included in the range "r=1" are installed, are included in the range "r=2". Herein, the sensors 40g to 40m are examples of third sensors.

Subsequently, the determining unit 212 further instructs the calculating unit 211 to identify the trend of the surface-direction distribution of the measurement values measured by the sensors 40a to 40m in the second cycles $\Delta t_2$. In response to the instruction received from the determining unit 212, the calculating unit 211 identifies the trend of the surface-direction distribution of the measurement values at each timing as measured by the sensors 40a to 40m in the second cycles $\Delta t_2$. Then, the determining unit 212 determines whether or not the measurement values measured by the sensors 40a to 40m are included in the trend of the surface-direction distribution of the measurement values as identified by the calculating unit 211.

Figure 15:
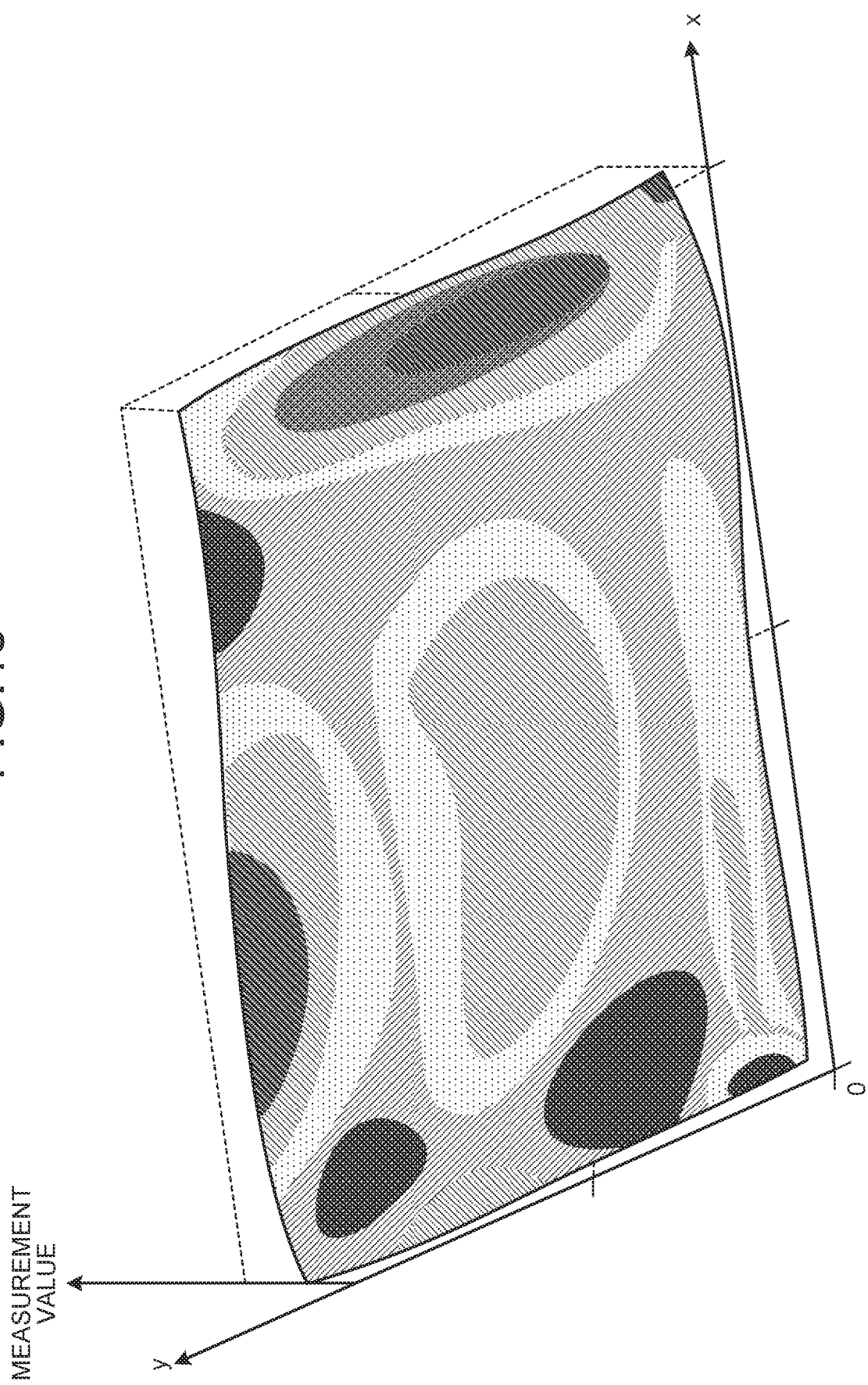
FIG. 15 is a diagram illustrating an example of an approximation curved surface.

In this way, until a plurality of measurement values is included in the distribution identified by the calculating unit 211, expansion of the range in which the sensors 40 are included and determination about whether or not the measurement values measured by a plurality of sensors 40 are included in the distribution identified by the calculating unit 211 is performed in a repeated manner. As a result of an increase in the number of activated sensors 40, for example, as illustrated in FIG. 15, the approximation curved surface identified by the calculating unit 211 becomes able to express more minute undulation. FIG. 15 is a diagram illustrating an example of the approximation curved surface. Thus, as a result of expanding the range in which the sensors 40 are included, the approximation curved surface identified by the calculating unit 211 approaches the trend of the surface-direction distribution of the measurement values $S_n$, and there is a decrease in the cumulative difference $\Delta S'$ of the differences $\Delta S$ between the measurement values S and the measurement values $S_n'$ on the approximation curved surface.

However, it is also possible to think of a case in which the sensors 40 discretely output the measurement values not having any continuity in the surface direction. In the situation in which the sensors 40 discretely output the measurement values not having any continuity in the surface direction, it is highly likely that the measurement values of each sensor do no indicate any signs of some natural phenomenon or some abnormality of a building structure. In that case, even if the range associated to the sensor ID of the sensor 40a is expanded until. "r=R" holds true, it is determined that the measurement values of a plurality of sensors 40 are not included in the trend of the distribution identified by the calculating unit 211.

In such a case, the determining unit 212 instructs the activation cycle managing unit 231 to stop the sensors 40. Then, regarding the sensor 40 to be activated in the first cycles in the normal situation, the determining unit 212 changes the sensor 40a to some other sensor 40, and instructs the activation cycle managing unit 231 to activate that other sensor 40 in the first cycles. In this way, even after the range associated to the sensor ID of the sensor 40a is expanded until "r=R" holds true, if it is determined that the measurement values of a plurality of sensors 40 are not included in the distribution identified by the calculating unit 211, the measurement values of the sensors 40 are not sent to the monitoring devices. As a result, the control device 20 holds back from sending, to the monitoring device, the measurement values not indicating any signs of some natural phenomenon or some abnormality of a building structure; and can reliably send, to the monitoring device, the measurement values indicating signs of some natural phenomenon or some abnormality of a building structure. As a result, while managing the management targets, the communication system 10 can hold down on unnecessary field investigation.

[Operations of Control Device 20]

Figure 16:
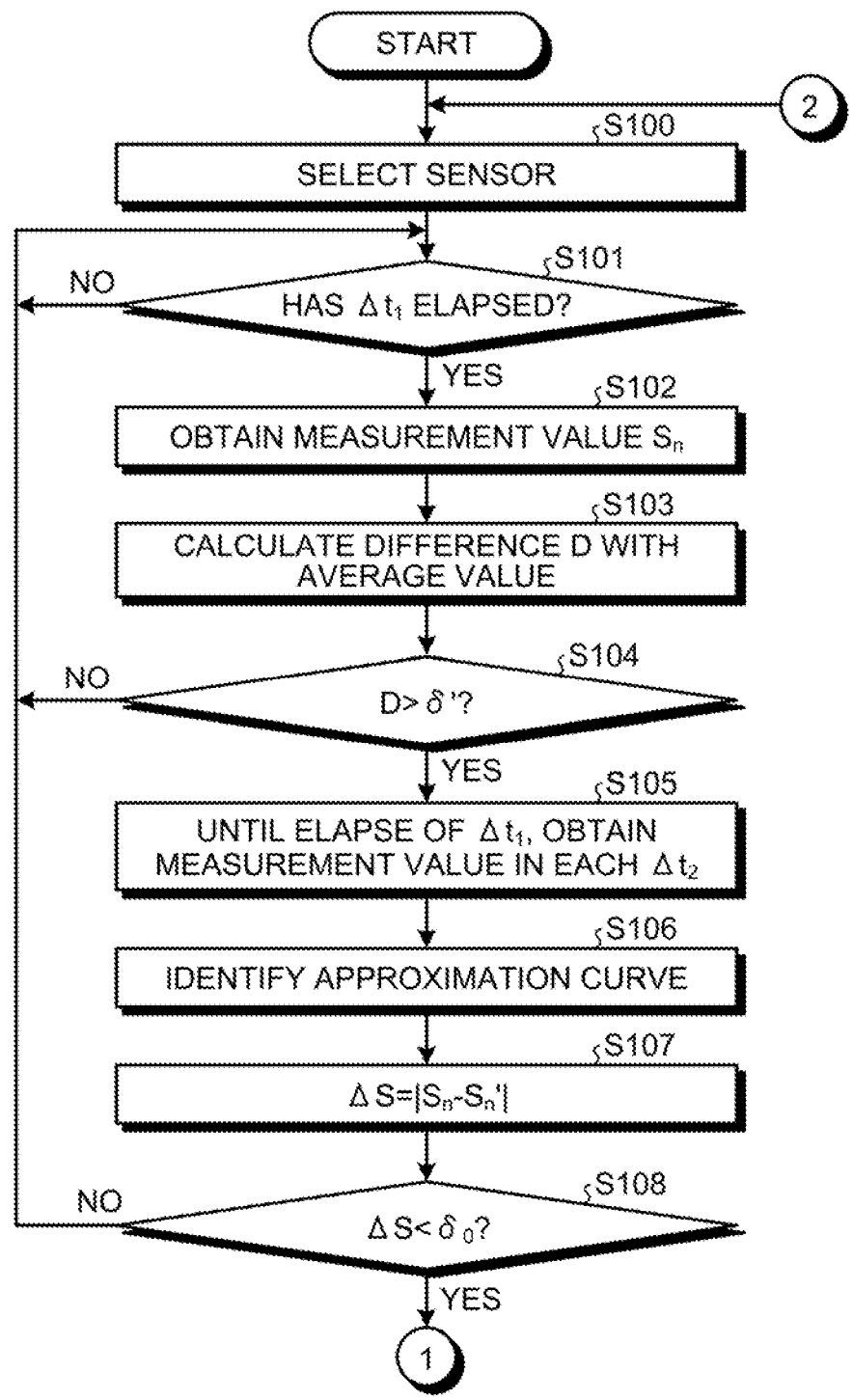
FIG. 16 is a flowchart for explaining an example of the operations performed in the control device.
Figure 17:
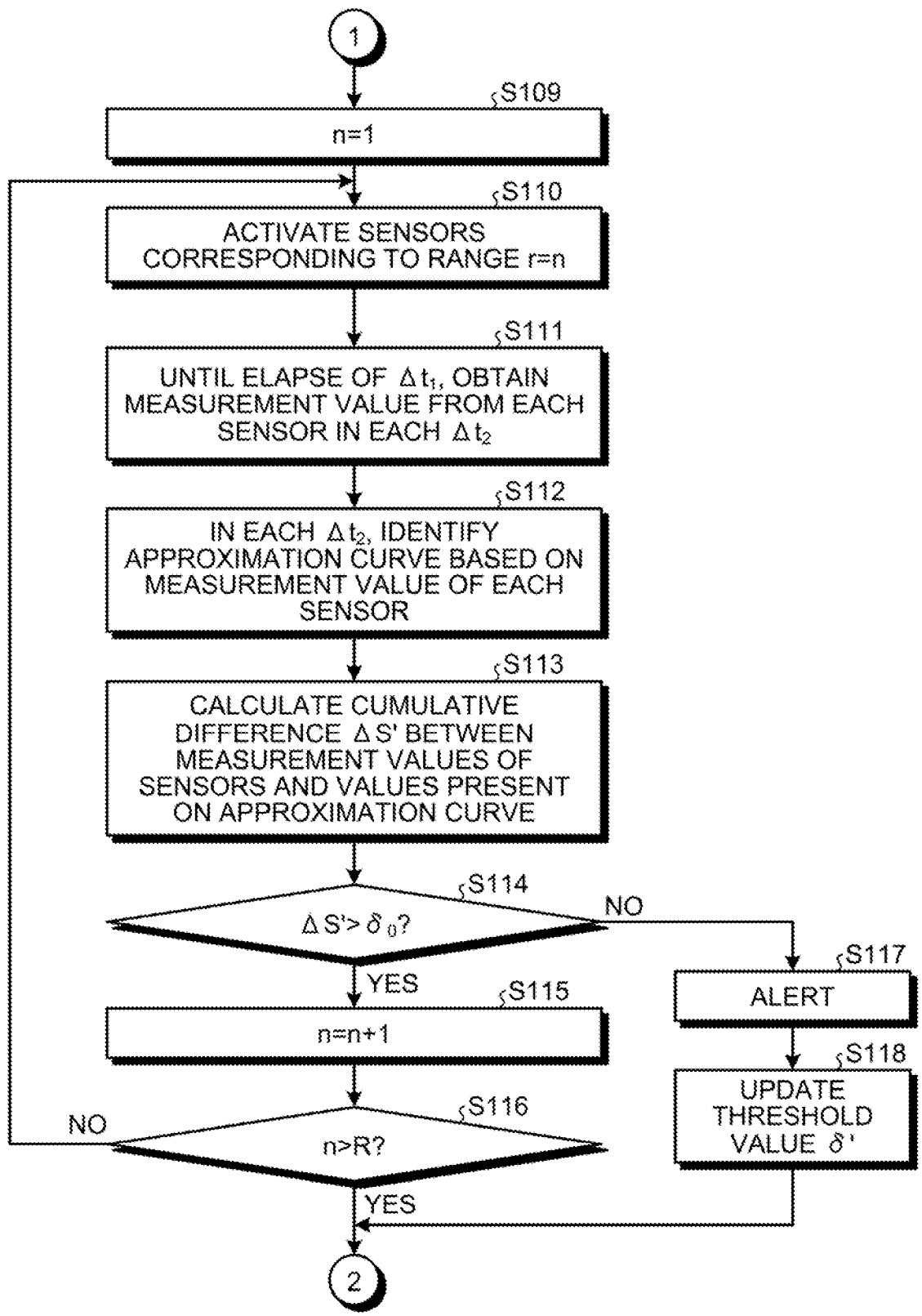
FIG. 17 is a flowchart for explaining an example of the operations performed in the control device.

FIGS. 16 and 17 are flowcharts for explaining an example of the operations performed in the control device 20.

Firstly, from among a plurality of sensors 40, the determining unit 212 selects, for example, in a random manner, the sensor 40a to be activated in the first cycles $\Delta t_1$ (S100). Then, the determining unit 212 instructs the activation cycle managing unit 231 to activate the selected sensor 40a in the first cycles $\Delta t_1$.

The activation cycle managing unit 231 determines whether or not one first cycle $\Delta t_1$ has elapsed (S101). If one first cycle $\Delta t_1$ has elapsed (Yes at S101), then the activation cycle managing unit 231 outputs the sensor ID of the sensor 40a to the activation instructing unit 230. Then, the activation instructing unit 230 sends an activation instruction, which includes the sensor ID output by the activation cycle managing unit 231, to the collection device 30 via the network 11.

Upon receiving the activation instruction from the control device 20, the collection device 30 obtains the sensor ID from the activation instruction. Then, the collection device 30 wirelessly sends an activation instruction to the sensor 40a corresponding to the obtained sensor ID. Upon receiving the activation instruction from the collection device 30, the sensor 40a obtains the measurement value $S_n$ that is measured using the measuring unit 45. Then, the sensor 40a wirelessly sends the measurement value S to the collection device 30. Upon receiving the measurement value $S_n$ from the sensor 40a, the collection device 30 sends the measurement value S and the sensor ID of the sensor 40a, which sent the measurement value $S_n$, to the control device 20 via the network 11.

Subsequently, the activation instructing unit 230 receives the sensor ID and the measurement value $S_n$ from the collection device 30 via the network 11, and thus obtains the measurement value $S_n$ (S102). Then, the activation instructing unit 230 stores the measurement value S; in a corresponding manner to the measurement timing and the sensor ID in the DB 22.

Subsequently, the determining unit 212 refers to the measurement values stored in the DB 22 and calculates the difference D between the measurement value $S_n$, which is measured by the sensor 40a, and the average value of the measurement values measured in the past (S103). Then, the determining unit 212 determines whether or not the calculated difference D is greater than a predetermined threshold value δ' (S104). If the difference D is equal to or smaller than the threshold value δ' (No at S104), then the activation cycle managing unit 231 again performs the operation at Step S01.

On the other hand, if the difference D is greater than the threshold value δ' (Yes at S104), then the determining unit 212 determines that the measurement value $S_n$ measured by the sensor 40a is an abnormal value. Then, the determining unit 212 instructs the activation cycle managing unit 231 to change the activation cycles of the sensor 40a from the first cycles $\Delta t_1$ to the second cycles $\Delta t_2$. In response to the instruction received from the determining unit 212, the activation cycle managing unit 231 changes the activation cycles of the sensor 40a from the first cycles $\Delta t_1$ to the second cycles $\Delta t_2$. As a result, an activation instruction is sent to the sensor 40a in each second cycle $\Delta t_2$ and, until the elapse of the first cycle $\Delta t_1$, the measurement value is obtained from the sensor 40a in each second cycle $\Delta t_2$ (S105).

Subsequently, the determining unit 212 instructs the calculating unit 211 to identify the trend of temporal variation in the measurement values measured by the sensor 40a in the first cycles $\Delta t_1$ and in the second cycles $\Delta t_2$. In response to the instruction received from the determining unit 212; from the DB 22, the calculating unit 211 obtains the measurement values measured in the first cycles $\Delta t_1$, and obtains the measurement values measured in the second cycles $\Delta t_2$ between the period of time from the timing $t_0$ to the timing $t_1$ at which the period of time corresponding to the first cycle $\Delta t_1$ elapses. Then, based on the obtained measurement values, the calculating unit 211 identifies, as the trend of temporal variation in the measurement values, the approximation curve that approximates the temporal variation in the measurement values (S106).

Subsequently, based on the approximation curve identified by the calculating unit 211, the determining unit 212 identifies the measurement value $S_n'$ that is present on the approximation curve at the same timing as the timing of the measurement value $S_n$ determined to be an abnormal value. Then, the determining unit 212 calculates the difference $\Delta S$ between the measurement value $S_n$ and the measurement value $S_n'$ (S107). Subsequently, the determining unit determines whether or not the difference $\Delta S$ is smaller than a predetermined threshold value $\delta_0$ (S108).

If the difference $\Delta S$ is equal to or greater than the threshold value $\delta_0$ (No at S108), then the determining unit 212 determines that the measurement value $S_n$, which is determined to be an abnormal value, is not included in the trend of measurement values as identified by the calculating unit 211, and determines that the measurement value $S_n$ represents noise. Subsequently, the determining unit 212 instructs the activation cycle managing unit 231 to reset the activation cycles of the sensor 40a from the second cycles $\Delta t_2$ to the first cycles $\Delta t_1$. In response to the instruction received from the determining unit 212, the activation cycle managing unit 231 resets the activation cycles of the sensor 40a from the second cycles $\Delta t_2$ to the first cycles $\Delta t_1$. Then, the activation cycle managing unit 231 again performs the operation at Step S101.

On the other hand, if the difference $\Delta S$ is smaller than the threshold value $\delta_0$ (Yes at S108), then the determining unit 212 determines that the measurement value $S_n$, which is determined to be an abnormal value, is included in the trend of measurement values as identified by the calculating unit 211, and determines that the measurement value $S_n$ does not represent noise. Then, the determining unit 212 initializes the variable n to one (S109 illustrated in FIG. 17).

Subsequently, the determining unit 212 refers to the range table 220 in the DB 22, and extracts the sensor IDs included in the range "r=n" that is associated to the sensor ID of the sensor 40a selected at Step S100. Then, the determining unit 212 instructs the activation cycle managing unit 231 to activate the sensors 40 having the extracted sensor IDs in the second cycles $\Delta t_2$. In response to the instruction received from the determining unit 212, the activation cycle managing unit 231 sets the activation cycle of the sensors 40, which have the sensor IDs specified by the determining unit 212, to the second cycles $\Delta t_2$. As a result, in each second cycle $\Delta t_2$, an activation instruction is sent by the activation instructing unit 230 to the sensor 40a and to a plurality of sensors 40 installed around the sensor 40a; and thus those sensors 40 are activated in each second cycle $\Delta t_2$ (S110). Then, the activation instructing unit 230 obtains, from each sensor 40, the measurement values in each second cycle $\Delta t_2$ until the elapse of the first cycle $\Delta t_1$ (S111).

Then, the determining unit 212 instructs the calculating unit 211 to identify the trend of the surface-direction distribution of the measurement values measured by the sensors 40 in each second cycle $\Delta t_2$. In response to the instruction received from the determining unit 212, the calculating unit 211 obtains, from the DB 22, the measurement values measured by the sensors 40 in each second cycle $\Delta t_2$ until the elapse in the period of time corresponding to the first cycle $\Delta t_1$. Then, based on the measurement values measured by the sensors 40, at each timing of measurement of the measurement values, the calculating unit 211 identifies, as the trend of the surface-direction distribution of the measurement values, an approximation curved surface that approximates the surface-direction distribution of the measurement values (S112).

Subsequently, at each timing of measurement of the measurement value $S_n$, for example, as illustrated in FIG. 13, the determining unit 212 calculates the difference $\Delta S$ of the measurement value $S_n$ measured by each sensor 40 with the measurement value $S_n'$ on the approximation curved surface as identified by the calculating unit 211. Then, the determining unit 212 adds the difference $\Delta S$ calculated for the measurement value $S_n$ measured by each sensor 40, and calculates the cumulative difference $\Delta S'$ (S113).

Subsequently, the determining unit 212 determines whether or not the cumulative difference $\Delta S'$ calculated in at least one of the measurement timings is greater than the threshold value $\delta_0$ (S114). If the cumulative difference $\Delta S'$ calculated in at least one of the measurement timings is greater than the threshold value $\delta_0$ (Yes at S114), then the determining unit 212 determines that the measurement values of a plurality of sensors 40 are not included in the trend of the surface-direction distribution. Then, the determining unit 212 increments the variable n by one (S115) and determines whether or not the value of the variable n is greater than a threshold value R (S116). If the value of the variable n is equal to or smaller than the threshold value R (No at S116), the determining unit 212 again performs the operation at Step S110. However, if the value of the variable n is greater than the threshold value R (Yes at S116), then the determining unit 212 instructs the activation cycle managing unit 231 to stop the sensors 40. Subsequently, the determining unit 212 again performs the operation at Step S100. As a result of performing the operation at Step S100, the sensor 40 to be activated in the first cycles in the normal situation again gets selected in a random manner.

Meanwhile, if the cumulative differences $\Delta S'$ calculated at all measurement timings are equal to or smaller than the threshold value $\delta_0$ (No at S114), then the determining unit 212 determines that the measurement values measured by a plurality of sensors 40 are included in the trend of the surface-direction distribution. Then, the determining unit 212 outputs the sensor IDs of the sensors 40 to the output unit 210. The output unit 210 obtains, from the DB 22, the measurement values corresponding to the sensor IDs output by the determining unit 212; and outputs an alert including the obtained measurement values and the sensor IDs to the monitoring device via the network 11 (S117). Then, the determining unit 212 updates the threshold value $\delta'$ to be used at Step S104 (S118). For example, the determining unit 212 multiplies a coefficient k, which is based on the measurement values of the sensors 40 configured to measure the measurement values of other types, to the threshold value $\delta'$, and updates the threshold value $\delta'$. Subsequently, the determining unit 212 again performs the operation at Step S100.

[Hardware]

Figure 18:
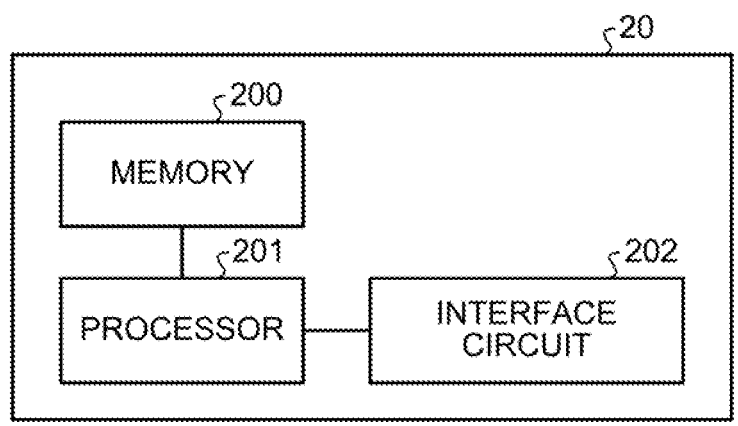
FIG. 18 is a diagram illustrating an example of the hardware of the control device.

FIG. 18 is a diagram illustrating an example of the hardware of the control device 20. For example, as illustrated in FIG. 18, the control device 20 includes a memory 200, a processor 201, and an interface circuit 202.

The interface circuit 202 is an interface for establishing a wired connection with the network 11.

The memory 200 is used to store a program that is meant for implementing the functions of the data processing unit 21 and the sensor managing unit 23, and to store the data referred to by the program. Moreover, the memory 200 is used to store the data of the DB 22. The processor 201 reads the program from the memory 200 and executes it so that, for example, the functions of the data processing unit 21 and the sensor managing unit 23 are implemented.

Meanwhile, the program that is stored in the memory 200 need not always be stored therein from the beginning. Alternatively, for example, the program can be stored in a portable recording medium such as a memory card insertable in the control device 20, and the control device 20 can obtain the program of the portion to be used in the processing from the portable recording medium and execute the program. Still alternatively, the program can be stored in some other computer or a server device, and the control device 20 can execute the program after obtaining it via a wireless communication line, a public line, the Internet, a LAN, or a WAN.

[Effect of Embodiment]

Given above is the explanation of the embodiment. The communication system 10 according to the embodiment includes a plurality of sensors 40, the collection device 30, and the control device 20. The sensors 40 are installed in a dispersed manner at a specific location. The collection device 30 collects the measurement values measured by the sensors 40. The control device 20 controls the sensors 40 based on the measurement values collected by the collection device 30. The control device 20 includes the calculating unit 211, the determining unit 212, the activation instructing unit 230, and the output unit 210. The determining unit 212 determines whether or not the measurement values measured by the first sensor, from among the sensors 40 installed in a dispersed manner at specific locations, in the first cycles are abnormal values. If the measurement values are determined to be abnormal values, then the activation instructing unit 230 activates the first sensor in the second-cycles that are shorter than the first cycles. The calculating unit 211 identifies the trend of temporal variation in the measurement values measured by the first sensor in the first cycles and in the second cycles. Moreover, the determining unit 212 determines whether or not the abnormal values are included in the trend of temporal variation. If the abnormal values are included in the trend of temporal, variation, then the activation instructing unit 230 activates a plurality of second sensors, which are installed around the first sensor, in the second cycles. Moreover, the calculating unit 211 identifies trend of the surface-direction distribution of the measurement values measured by the first sensor and the second sensors in the second cycles. Furthermore, the determining unit 212 determines whether or not the measurement values measured by the first sensor and the second sensors in the second cycles are included in the trend of the surface-direction distribution. If the measurement values measured by the first sensor and the second sensors in the second cycles are included in the trend of the surface-direction distribution, then the output unit 210 outputs the measurement values measured by the first sensor and the second sensors. As a result, in the communication system 10 according to the present embodiment, from among the measurement values measured by a plurality of sensors 40, the measurement values indicating signs of possible development into abnormality can be screened with accuracy.

Moreover, in the embodiment described above, based on the statistical value obtained from the measurement values measured by the first sensor in the first cycles, the determining unit 212 determines whether or not the measurement values measured by the first sensor in the first cycles are abnormal values. As a result, the determining unit 212 can accurately identify the abnormal values from among the measurement values measured by the first sensor.

Furthermore, in the embodiment described above, if the measurement values measured by the first sensor in the first cycles and the average value of the measurement values measured by the first sensor in the first cycles from the current point of time till a predetermined point of time in the past have the difference equal to or greater than a threshold value, then the determining unit 212 determines that the measurement values measured by the first sensor in the first-cycles are abnormal values. As a result, from among the measurement values measured by the first sensor, the determining unit 212 can identify the abnormal values with a simple method.

Moreover, in the embodiment described above, the calculating unit 211 identifies, as the trend of temporal variation, an approximation curve that approximates the temporal variation in the measurement values measured by the first sensor in the first cycles and in the second cycles. Furthermore, if the value present on the approximation curve, which is identified by the calculating unit 211, at the timing of measurement of an abnormal value has a difference with the abnormal value to be smaller than a predetermined threshold value, then the determining unit 212 determines that the abnormal value is included in the trend of temporal variation. As a result, from among the measurement values measured by the first sensor, the determining unit 212 can accurately exclude noise that is not included in the trend of temporal variation in the measurement values.

Moreover, in the embodiment described above, the calculating unit 211 identifies, as the trend of the surface-direction distribution, an approximation curved surface that approximates the surface-direction distribution of the measurement values measured by the first sensor and the second sensors in the second cycle. Furthermore, the determining unit 212 adds, for a plurality of measurement values, the difference between the value present on the approximation curved surface identified by the calculating unit 211 and the corresponding measurement value; and, if the cumulative difference is smaller than a predetermined threshold value, determines that each measurement value is included in the trend of the surface-direction distribution. As a result, in the communication system 10, from among the measurement values measured by a plurality of sensors 40, the measurement values indicating signs of possible development into abnormality can be identified with accuracy.

Furthermore, in the embodiment described above, if is determined that none of the measurement values measured by the first sensor and the second sensors in the second cycles are included in the trend of the surface-direction distribution, then the activation instructing unit 230 further activates, in the second cycle, a plurality of third sensors installed around the area including the first sensor and the second sensors. The calculating unit 211 identifies the trend of the surface-direction distribution of the measurement values measured by the first sensor, the second sensors, and the third sensors in the second cycles. The determining unit 212 determines whether or not the measurement values measured by the first sensor, the second sensors, and the third sensors in the second cycles are included in the trend of the surface-direction distribution. If the measurement values measured by the first sensor, the second sensors, and the third sensors in the second cycles are included in the trend of the surface-direction distribution, then the output unit 210 outputs the measurement values measured by the first sensor, the second sensors, and the third sensors. As a result, in the communication system 10, from among the measurement values measured by the sensors 40, the measurement values indicating signs of possible development into abnormality can be identified with accuracy.

[Supplementary Information]

Meanwhile, the technology disclosed herein is not limited by the embodiment described above, and can be modified in various ways within the technical scope.

For example, in the embodiments described above, the control device 20 and the collection device 30 are configured to be separate devices. However, the technology disclosed herein is not limited to that case, and alternatively the control device 20 and the collection device 30 can be configured to be a single device. Moreover, when a plurality of collection devices 30 is installed in the communication system 10, one of the collection devices 30 can be equipped with the functions of the control device 20. Furthermore, the functions of the collection device 30 can be provided in one of the sensors 40. Moreover, the functions of the control device 20 and the collection device 30 can be provided in one of the sensors 40.

In the embodiment described above, in order to facilitate understanding of the control device 20, the collection device 30, and the sensors 40 according to the embodiment; the processing blocks of each of the control device 20, the collection device 30, and the sensors 40 are functionally separated according to the main processing details. Thus, the technology disclosed herein is not limited by the separation method and the names of the processing blocks. Regarding the processing blocks of each of the control device 20, the collection device 30, and the sensors 40; either the processing blocks can be further broken up into smaller processing blocks according to the processing details or a plurality of processing blocks can be integrated into a single processing block. Moreover, the operations performed using each processing block can be implemented either as software-based operations or using dedicated hardware such as ASIC (Application Specific Integrated Circuit).

According to an aspect of the control device, the control system, and the control method disclosed in the application concerned enable accurate screening of such measurement values which, from among the measurement values measured by a plurality of sensors, indicate signs of possible development into abnormality.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control device comprising:
a memory; and
a processor coupled to the memory, wherein the processor executes a process comprising:
first determining whether or not a measurement value measured by a first sensor among a plurality of sensors installed in a dispersed manner at specific location in a first cycle, is an abnormal value;
first activating, when the measurement value is determined to be an abnormal value, the first sensor in a second cycle which is shorter than the first cycle;
first identifying a trend of a temporal variation of measurement values measured by the first sensor during the first cycle and the second cycle;
second determining whether or not the abnormal value is included in the trend of variation;
second activating, when the abnormal value is included in the trend of variation, a plurality of second sensors which are installed around the first sensor, in the second cycle;
second identifying a trend of surface direction distribution of measurement values measured by the first sensor and the plurality of second sensors in the second cycle, the first sensor and the plurality of second sensors being arranged on a surface at the specific location;
third determining whether or not measurement values measured by the first sensor and the plurality of second sensors in the second cycle are included in the trend of distribution; and
outputting, when measurement values measured by the first sensor and the plurality of second sensors in the second cycle are included in the trend of distribution, measurement values measured by each of the first sensor and the plurality of second sensors.

2. The control device according to claim 1, wherein
the first determining includes determining whether or not measurement value measured by the first sensor in the first cycle is an abnormal value, based on statistical value that is obtained from measurement value measured by the first sensor in the first cycle.

3. The control device according to claim 2, wherein
the first determining includes determining that the measurement value measured by the first sensor in the first cycle is the abnormal value when the measurement value measured by the first sensor in the first cycle and average value of the measurement values measured by the first sensor in the first cycle from current point of time till a predetermined point of time in past have difference equal to or greater than a threshold value.

4. The control device according to claim 1, wherein
the first identifying includes identifying, as the trend of the temporal variation, an approximation curve that approximates the temporal variation of measurement values measured by the first sensor during the first cycle and the second cycle, and
the second determining includes determining, when a value present on the approximation curve, which is identified by the first identifying, at timing of measurement of the abnormal value and the abnormal value have difference smaller than a threshold value, that the abnormal value is included in the trend of the temporal variation.

5. The control device according to claim 1, wherein
the second identifying includes identifying, as the trend of the surface-direction distribution, an approximation curved surface that approximates trend of surface-direction distribution of a plurality of measurement values measured by each of the first sensor and the plurality of second sensors in the second cycle, and
the third determining includes accumulating, for a plurality of measurement values, difference between value on the approximation curved surface identified by the second identifying and corresponding measurement value, and determining that each measurement value is included in the trend of the surface-direction distribution when cumulative value is smaller than a threshold value.

6. The control device according to claim 1, wherein
the second activating includes activating a plurality of third sensors, which is installed around area including the first sensor and the second sensors, in the second cycle, when it is determined that measurement values measured by the first sensor and the plurality of second sensors in the second cycle are not included in the trend of the surface-direction distribution,
the second identifying includes identifying trend of surface-direction distribution of measurement values measured by the first sensor, the plurality of second sensors, and the plurality of third sensors in the second cycle,
the third determining includes determining whether or not measurement values measured by the first sensor, the plurality of second sensors, and the plurality of third sensors in the second cycle are included in the trend of the surface-direction distribution, and
the outputting includes outputting measurement values measured by the first sensor, the plurality of second sensors, and the plurality of third sensors when measurement values measured by the first sensor, the plurality of second sensors, and the plurality of third sensors in the second cycle are included in the trend of the surface-direction distribution.

7. A communication system comprising:
a plurality of sensors installed in a dispersed manner at specific location;
a collection device that collects measurement value measured by each of the plurality of sensors; and
a control device that controls each of the plurality of sensors based on the measurement values collected by the collection device, wherein
the control device includes
a memory; and
a processor coupled to the memory, wherein the processor executes a process comprising:
 first determining whether or not a measurement value measured by a first sensor among the plurality of sensors, in a first cycle is an abnormal value;
 first activating, when the measurement value is determined to be an abnormal value, the first sensor in a second cycle which is shorter than the first cycle,
 first identifying a trend of a temporal variation of measurement values measured by the first sensor during the first cycle and the second cycle,
 second determining whether or not the abnormal value is included in the trend of variation,
 second activating, when the abnormal value is included in the trend of variation, a plurality of second sensors, which are installed around the first sensor, in the second cycle,
 second identifying a trend of surface direction distribution of measurement values measured by the first sensor and the plurality of second sensors in the second cycle, the first sensor and the plurality of second sensors being arranged on a surface at the specific location,
 third determining whether or not measurement values measured by the first sensor and the plurality of second sensors in the second cycle are included in the trend of distribution, and
 outputting, when measurement values measured by the first sensor and the plurality of second sensors in the second cycle are included in the trend of distribution, measurement values measured by each of the first sensor and the plurality of second sensors.

8. A control method that makes a control device perform:
determining whether or not a measurement value measured by a first sensor among a plurality of sensors installed in a dispersed manner at specific location, in a first cycle is an abnormal value;
activating, when the measurement value is determined to be an abnormal value, the first sensor in a second cycle which is shorter than the first cycle;
identifying a trend of a temporal variation of measurement values measured by the first sensor during the first cycle and the second cycle;
determining whether or not the abnormal value is included in the trend of variation;
activating, when the abnormal value is included in the trend of the trend of variation, a plurality of second sensors, which are installed around the first sensor, in the second cycle;
identifying a trend of surface direction distribution of measurement values measured by the first sensor and the plurality of second sensors in the second cycle, the first sensor and the plurality of second sensors being arranged on a surface at the specific location;
determining whether or not measurement values measured by the first sensor and the plurality of second sensors in the second cycle are included in the trend of distribution; and
outputting, when measurement values measured by the first sensor and the plurality of second sensors in the second cycle are included in the trend of the surface-direction distribution, measurement values measured by each of the first sensor and the plurality of second sensors.

* * * * *